June 7, 1932.　　　C. R. LEITER　　　1,861,538
DIE
Filed June 28, 1929　　2 Sheets-Sheet 1

INVENTOR
Charles R. Leiter
BY Harold E. Stonebraker
his ATTORNEY

June 7, 1932. C. R. LEITER 1,861,538
DIE
Filed June 28, 1929 2 Sheets-Sheet 2
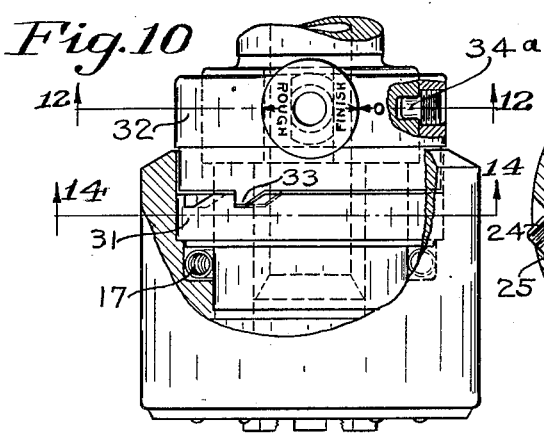
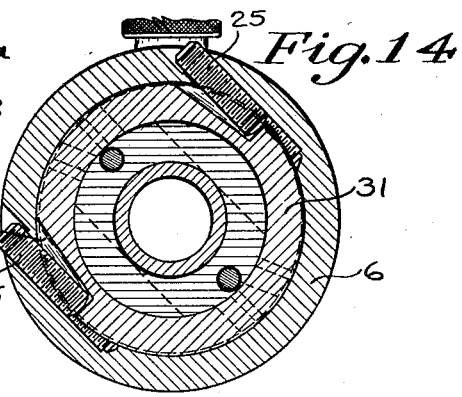
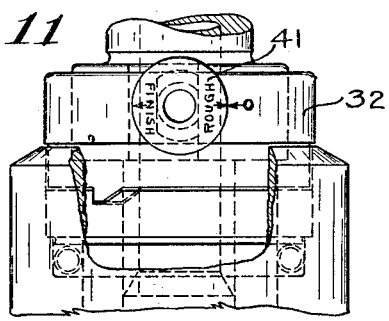
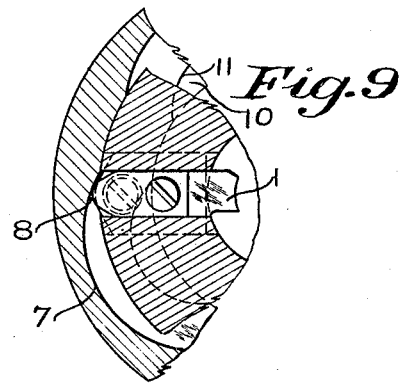
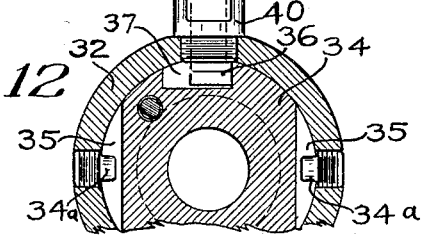
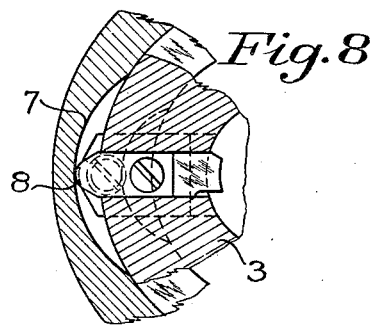
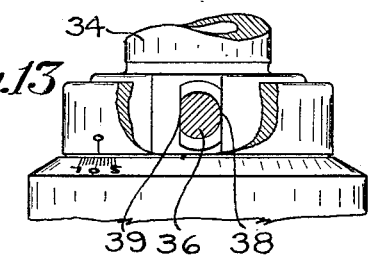
INVENTOR
Charles R. Leiter
BY Harold E. Stonebraker
his ATTORNEY Patented June 7, 1932

1,861,538

UNITED STATES PATENT OFFICE

CHARLES R. LEITER, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

DIE

Application filed June 28, 1929. Serial No. 374,466.

This invention relates to improvements in dies, especially to that class of dies used for cutting threads on bolts or the like.

The object of the invention is to provide a die which is simple and compact in construction and positive in operation.

Another object of the invention is to provide a die in which a quick positive action is imparted to the chasers when retracted to eject the chips.

Still another object of the invention is to improve the mounting of the die head on the shank.

A further object of the invention is to provide a die of this kind having means for adjusting the chasers to two or more operative positions, if desired, so that one or more finishing cuts may be made on the work piece.

To these and other ends, the invention comprises the structure that will appear clearly from the following description when read in conjunction with the accompanying drawings, the novel features being pointed out in the claims following the description.

In the drawings:

Figure 8 is a fragmentary section showing a chaser block in retracted position;

Figure 9 is a similar view showing a chaser block in operative position;

Figure 10 is a front elevation partly broken away to expose underlying parts, of a die illustrating a modified construction;

Figure 11 is a similar view showing parts in another position;

Figure 12 is a transverse section showing devices for changing the relative operative positions of the cam ring and head, taken on line 12—12, Figure 10;

Figure 13 is a fragmentary sectional view of the same, and

Figure 14 is a transverse section illustrating devices for adjusting the cam ring relatively to its locking ring and taken on line 14—14, Figure 10.

Similar reference characters refer to the same part in all the figures of the drawings.

Figure 2:
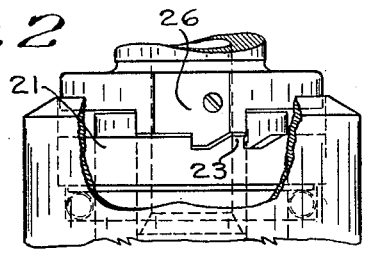
Figure 2 is a similar view showing the parts in another position.
Figure 7:
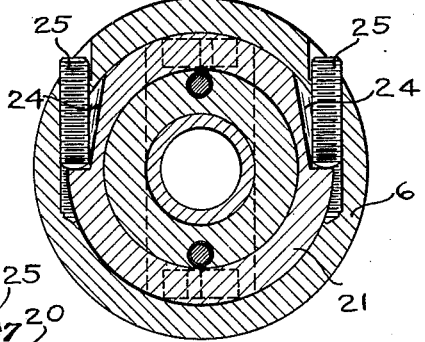
Figure 7 is a transverse section, illustrating devices for adjusting the cam ring relatively to its locking ring and taken on line 7—7, Figure 1.

In the embodiment illustrated a plurality of chasers or cutters 1 are mounted for radial movement into and out of operative engagement with a work piece adapted to feed into a central opening in the die head as the work progresses thereon. The chasers are mounted on chaser blocks 2 to which they may be secured by means of headed screws as shown. The chaser blocks are slidably mounted in guideways provided therefor in a head 3.

Means are provided for positively moving the chaser blocks and chasers radially to and from operative position. To this end a cam ring 6 is mounted on the head 3 for relative rotation thereon and is provided with cams 7 adapted to engage cam surfaces 8 on the outer ends of the chasers. The construction is such that when the cam ring is moved from the position of Figure 8 to that of Figure 9, the chasers are projected inwardly to operative position. A pin or projection 9 is carried on a screw threaded in the chaser block and projects into a recess 10 formed in the cam ring, and on the inner face of this recess a cam 11 is provided on the cam ring, which is adapted to engage the pin 9 to retract the chaser when the cam ring is turned in the reverse direction.

The head is mounted on a shank or carrier 12 for limited axial movement thereon. To this end the head is provided with openings in which headed screws 13 are arranged and threaded into a flange 14 of the shank. The openings in the head are counterbored to provide recesses for springs 15 coiled about the screws and engaging the wall of the recess and anchored against the heads of the screws. By this construction it will be understood that the head resiliently engages the shank but has a limited movement relatively thereto against the tension of the springs 15.

Manual means are provided for turning the cam ring relatively to the head to project the chaser blocks, the reverse movement being effected resiliently by means of springs. To this end the cam ring is provided with a circumferential recess 16 in which are arranged the springs 17, which engage studs 18 projecting inwardly from the cam ring at one end and are anchored against the studs 19 projecting into the recess from the head 3. The cam ring has a hand piece 20 projecting therefrom by which the cam ring may be turned relatively to the head against the resiliency of the springs 17.

Adjustable means are provided for fixing the normal operative position of the cam ring on the head which also fixes the operative position of the chasers. Said means comprises a locking ring 21 seated in a recess 22 in the upper end of the cam ring, and having a feather or locking device 23 on its upper edge and two recesses 24 in its circumference. Screws 25 are threaded in parallel tangential openings in the cam ring and engage abutments formed on the locking ring by the recesses. The screws 25 serve to fix the position of the cam ring and locking ring relatively to each other and by turning one of the screws in one direction and the other in the reverse direction the locking ring and cam ring may be adjusted relatively to each other, and since the locking ring is locked to the head, when the chasers are in operative position as will presently appear this adjustment serves to vary the relative position between the cam ring and head when operating on work pieces of different diameters.

Figure 1:
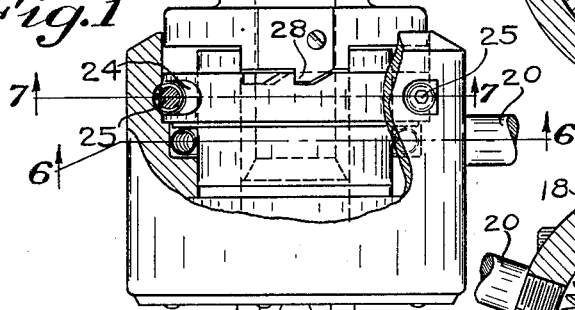
Figure 1 is a front elevation partly in section and broken away to illustrate underlying parts.
Figure 6:
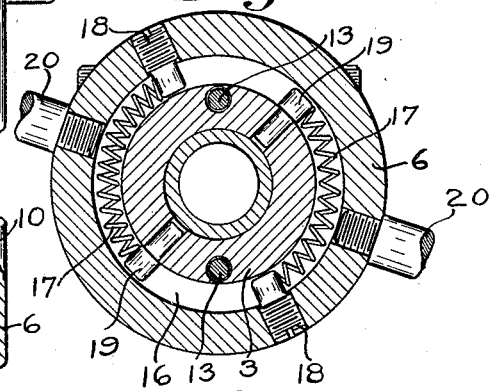
Figure 6 is a transverse section showing the arrangements of the springs for actuating the cam ring, taken substantially on line 6—6, Figure 1.

The die head is fixed against rotation relatively to the shank by means of a block 26, which engages a slot provided therefor in the upper end of the head. Arranged in the recess 22, and secured to the shank by screws or other suitable means is a locking device or ring 27 having a projection 28 adapted to engage the feathers 23 on the locking ring 21, two interengaging positions being provided between the locking devices 27 and 21 as shown in Figures 1 and 2. When the cam ring is turned to project the chasers to operative position from the Figure 2 position the feather ring rides over the projection on the ring 27 against the resiliency of the springs 15 and snaps into interlocking engagement when the Figure 1 position is reached with the chasers projected to operative position and locks the cam ring against the action of the springs 17.

Figure 3:
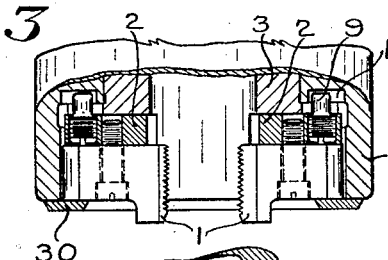
Figure 3 is a transverse vertical section through the chaser blocks.
Figure 4:
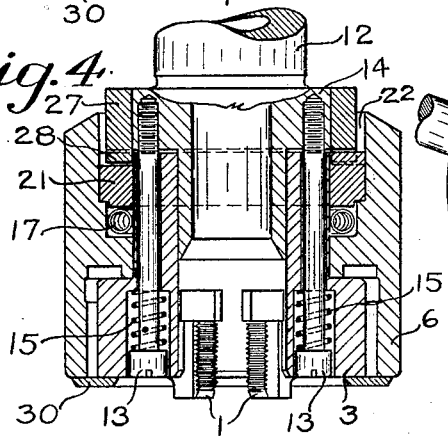
Figure 4 is a transverse vertical section through the head and cam ring.
Figure 5:
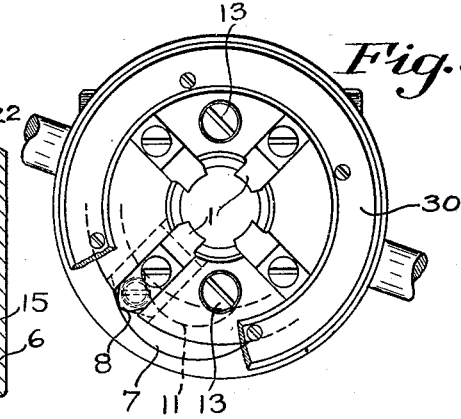
Figure 5 is an inverted plan view partly broken away to show the means for actuating the chaser blocks.

Briefly the operation of the device described is as follows: The operative position of the chasers relative to the work piece is adjusted by adjusting the cam ring relatively to the locking ring 21 by means of the screws 25. The cam ring 6 is then turned on the die head against the action of the springs 17 causing the cams 7 to project the chasers inwardly to operative position and at the same time the projection 28 rides over the projection of the locking ring, the die head yielding on the shank for this purpose against the resiliency of the springs 15. During the cutting operation, the die head is rotated relatively to the work piece and as the work progresses, the die and work piece are fed axially toward each other. When the work on the work piece is completed, the feeding movement is stopped but continued rotation draws the chasers and with them the die head from the shank against the action of the springs 15 until the projection 23 on the locking ring can pass over the lug 28 on the shank when the springs 17 operate to turn the cam ring, and the cams 11 engage the chaser blocks to retract them from the work piece. By reference to Figure 3 of the drawings, it will be noted that the openings for the screws which secure the chasers to the chaser blocks are slightly larger than the screws, to provide a certain amount of lost motion between the chasers and the chaser blocks. A slight clearance is also provided between the pins 9 and retracting cams 11, this permits the chaser blocks and cam ring to acquire a certain amount of momentum before retracting the chasers. As a result a sudden movement is imparted to the chasers which ejects the chips therefrom. If desired a facing ring 30 may be secured to the face of the die head to improve the appearance and protect the underlying parts from chips.

In performing certain kinds of work, it is desirable to make a light finishing cut after a heavy rough cut has been made. In Figures 10 to 14 a modified construction of the connection of the locking ring on the shank is illustrated whereby the chasers may be quickly adjusted for a light finishing cut. The mounting of the chaser blocks and cam ring is substantially the same as that described above.

In this arrangement, a locking ring 31, is adjustably secured to the cam ring 6 by means of adjusting screws 25 threaded in the cam ring and engaging abutments provided therefor in the locking ring. A locking ring 32 has a lug or projection 33 cooperating with the locking ring 31 and is mounted on the shank 34 for limited relative rotation thereon. Pins 34$^a$ are threaded in the ring and project into diametrically opposite slots 35 in the shank. By this construction the ring is secured to the shank but has a limited turning movement thereon relative to the die head.

Also mounted in the ring 32 is a stud 36 which projects inwardly into a slot 37 provided therefor in the shank. Due to the action of the springs 17, the ring 32 turns on the shank until the stud 36 engages an abutment formed by the end of the slot. The stud 36 has two portions 38 and 39 for engaging the abutment at different distances from the axis of the stud. When the face 39 of the stud engages the end of the slot the ring 32 is set for a heavy rough cut, if after the rough cut is made, the stud 36 is turned until the face 38 engages the end of the slot in the ring, the ring is set for a second lighter finishing cut. Means are provided for turning the stud manually and to this end, a thimble 40 is threaded in the ring 32, and the stud has a bearing in this thimble, and at its outer end has a knurled finger piece 41, secured thereto. If desired cooperating pointers may be provided on the finger piece and the ring to indicate the proper positions of the finger piece for rough and finishing cuts. The relative adjusted positions of the cam ring and ring 32 may also be indicated if desired by means of a scale on the cam ring and a cooperating pointer on the ring 32 as shown in Figure 13.

While the invention has been described with reference to the particular embodiment illustrated in the drawings it is not restricted to the details herein disclosed, but this application is intended to cover such modifications or departures as may come within the intent or scope of the following claims.

I claim:

1. A die comprising a head, a block movable in the head, a chaser mounted on the block and movable therewith to and from operative position, a ring movably mounted on the head, a cam on the ring for moving the chaser to operative position when the ring is moved in one direction, a spring for moving the ring in another direction, and a second cam on the ring for moving the chaser from operative position when the ring moves under the action of its spring, said cams being so arranged relatively to each other that the second cam engages the chaser to retract it only after the ring has acquired momentum under the action of its spring.

2. A die comprising a shank, a head carried thereon, resilient means for holding the head in normal position on the shank, blocks movable in said head, chasers mounted on said blocks and movable therewith to and from operative engagement with a work piece, a ring movable on said head, a set of cams on the ring for moving the chasers to operative position when the ring is moved in one direction, a spring for moving the ring in another direction, a second set of cams on the ring for retracting the chasers from operative position when the ring moves under the action of its spring, said sets of cams being so arranged relatively to each other that the ring moves independently of the chasers to acquire momentum before moving them, means operating against the action of said resilient means for locking the ring against the action of its spring while the chasers are in operative position, and means operating automatically for moving the head on the shank to release said locking means.

3. A die comprising a head, a block movable in the head, a chaser mounted on the block and movable therewith to and from operative position, a ring rotatably mounted on the head, a cam on the ring for moving the chaser to operative position, resilient means for moving the cam in the reverse direction, a projection on said block, and a second cam on said ring engageable with said projection to move the chaser from operative position when the ring is moved under the action of said resilient means, the arrangement of said projection and cams being such that the ring acquires momentum under the action of the resilient means before said second cam engages said projection to move the chaser block.

4. A die comprising a head, a block movable in the head, a chaser mounted on the block and movable therewith to and from operative position, a ring rotatively mounted on the head, means on the ring for projecting the chaser to operative position when the ring is turned in one direction, resilient means for turning the ring in a reverse direction, and a cam on the ring for retracting the chaser when the ring moves under the action of said spring, said cam being so arranged relative to said projecting means that it actuates the chaser only when the ring has acquired momentum under the action of its spring.

In witness whereof, I have hereunto signed my name.

CHARLES R. LEITER.